(No Model.)
J. E. KLINE.
CAR COUPLING.
No. 468,348. Patented Feb. 9, 1892.
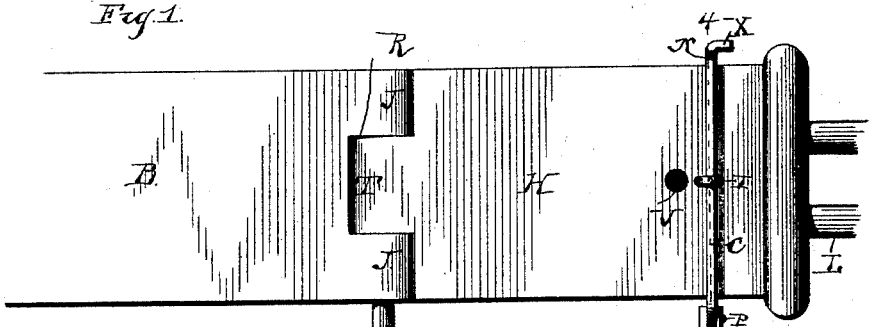
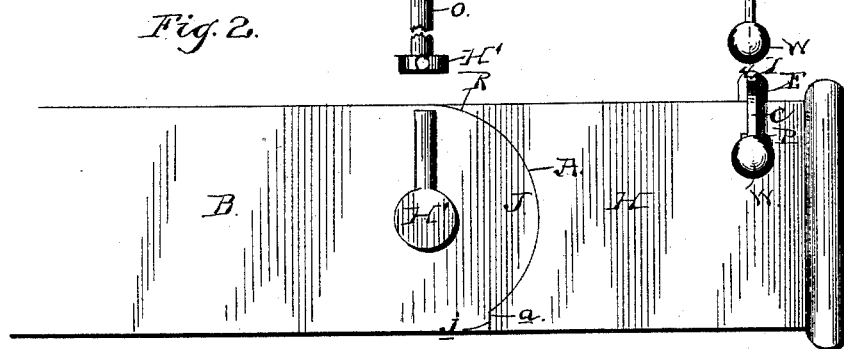
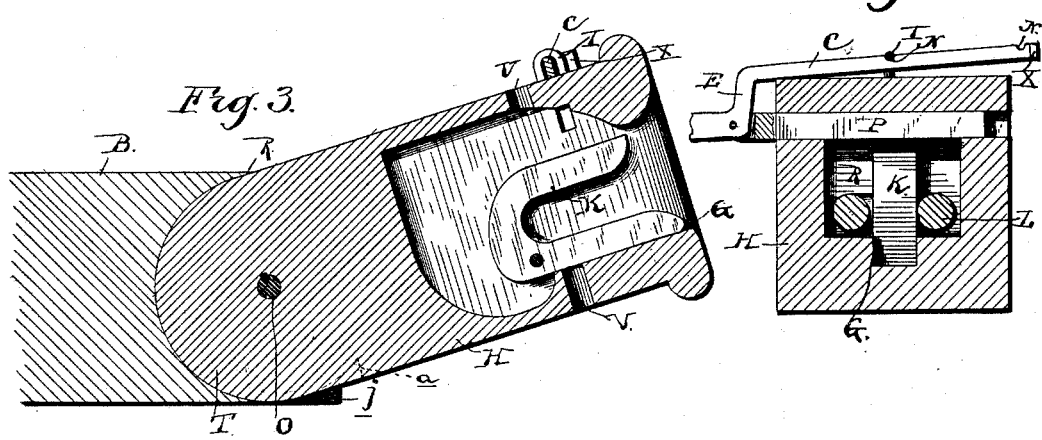
Witnesses
Inventor
John E. Kline,
By his Attorneys,
C. A. Snow & Co.

UNITED STATES PATENT OFFICE.

JOHN E. KLINE, OF CASEY, ILLINOIS, ASSIGNOR OF ONE-HALF TO WILLIAM F. REDMAN AND JOHN W. REDMAN, OF SAME PLACE.

CAR-COUPLING.

SPECIFICATION forming part of Letters Patent No. 468,348, dated February 9, 1892.

Application filed May 19, 1891. Serial No. 393,327. (No model.)

*To all whom it may concern:*

Be it known that I, JOHN E. KLINE, a citizen of the United States, residing at Casey, in the county of Clark and State of Illinois, have invented a new and useful Car-Coupling, of which the following is a specification.

This invention relates to car-couplings, and more especially to that class thereof known as "rolling-detent;" and the object of the same is to produce a car-coupling of this character having a swinging catch mounted in a draw-head which is pivotally connected to the draw-bar.

To this end the invention consists of the specific details of construction hereinafter more fully described and claimed, and as illustrated on the sheet of drawings, wherein—

Figure 1 is a plan view of a portion of the draw-bar and the whole of the draw-head, showing a link as locked therein. Fig. 2 is a side elevation of the draw-bar and draw-head. Fig. 3 is a central longitudinal section of Fig. 1 with the draw-head slightly raised above a horizontal line and the catch in position to engage an approaching link. Fig. 4 is a section on the line 4 4 of Fig. 1.

Referring to the said drawings, the letter B designates a draw-bar, which is suitably supported beneath the car-body and has a deep recess R at its front end, whereby it is practically bifurcated in plan, as seen in Fig. 1, and the projections J at each side of this recess have forwardly-curved front faces with shoulders *j* at their lower ends.

H designates the draw-head, of approximately the same size in cross-section as the draw-bar and having a tongue T at its rear end, which fits loosely in said recess R, the body of the draw-head being cut away, as at A, each side of said tongue, so as to fit around the projection J, and having a shoulder *a* at its lower end normally abutting against that lettered *j* when the draw-head and draw-bar are in alignment. Keyed in the tongue T and journaled through the projections J, concentric with their curved front faces, is a horizontal operating-shaft O, which extends to the right of the draw-head and has an operating-handle H' on its outer end standing about even with the side of the car. When this handle is moved, it will be obvious that the draw-head will be raised so as to accommodate the link in the mouth thereof to a higher draw-head on another car.

In the front end of the draw-head is the usual opening for the reception of the link, and this opening may be intersected by a vertical pin-opening V for the reception of the usual pin.

The letter K designates a U-shaped catch, which is pivoted at its bend in a groove G in the bottom of the draw-head, so that one arm will lie in said groove in the manner best seen in Fig. 3; but when a link L is driven into the mouth of the draw-head this catch will be caused to turn about its pivot to a vertical position, as shown in Fig. 4.

Sliding transversely through the draw-head above the link-opening therein is a pin P, which when pushed in passes in front of the raised catch and holds the same locked, so as to prevent the withdrawal of the link after it has been engaged in the catch. The letter C designates a coupling-rod having an elbow E in its body at about the center, which is pivotally connected to the outer end of the pin. The outer portion of this rod extends from this elbow to a point about even with the side of the car and there carries a weight W, holding this end normally depressed, and the inner end, where it passes over the top of the draw-head, passes loosely through a staple or eye I therein and has its extremity X bent laterally to prevent its complete withdrawal from the eye. The upper side of this inner end is provided with two notches N at proper points to hold the pin P either in or out of engagement with the catch.

With the above construction of parts a car can be coupled to another car whose draw-head is higher without the use of the bent links heretofore necessary, which links were hard to find when most wanted, liable to become lost after they were used, and at all times much weaker than an ordinary straight link and more expensive to make. By operating the handle H' at the side of the car the draw-head can thus be raised so as to direct the link into a higher draw-head. When a link is driven into the mouth of a draw-head, it passes into the mouth of the catch K and turns the latter to an upright position. The weight W, being then grasped by the operator, is raised slightly, whereby the coupling-rod is turned about its pivotal connection with the pin and the extreme notch N disengaged from the eye I. The weight W is then pushed inwardly, which moves the pin in front of the catch K and locks it in position, the inner end of the rod C passing through the eye until the inner notch N engages it and thereby holds the pin locked. The weight W is on the same side of the draw-head with the handle H', and hence if both are on the right-hand side an operator at one side of the track will have access to the handle and the weight of one of the draw-heads in any event. Considerable change in the details of construction may be made without departing from the spirit of my invention.

What is claimed as new is—

1. In a car-coupling, the combination, with the draw-bar having a recess in its front end, the projections at the sides of said recess having curved front faces with shoulders at their lower ends, of the draw-head having a rearwardly-extending tongue loosely seated in said recess, the cut-away portions at each side of said tongue being curved to fit said projections and also having shoulders at their lower ends, an operating-rod journaled through said projections concentric with their curved faces and keyed in said tongue, and a handle at the extremity of said rod, substantially as described.

2. In a car-coupling, the combination, with the draw-head having an opening in its front end provided with a groove and a U-shaped catch pivoted at its bend in said groove, of a pin passing transversely through the draw-head and adapted to engage the free end of the catch, and a sliding coupling-rod having an elbow in its body connected to the head of said pin, its inner end passing over the draw-head through an eye and having a laterally-bent extremity and its outer end extending to the side of the car, substantially as described.

3. In a car-coupling, the combination, with a draw-head and a pivoted catch therein, of a pin moving transversely through the draw-head and adapted to engage the free end of the catch, a sliding coupling-rod having an elbow in its body pivoted to the head of said pin, its inner end passing over the draw-head and having notches on its upper side and a laterally-bent extremity and its outer end extending to the side of the car and having a weight, and an eye in the top of the draw-head loosely embracing said inner end, as and for the purpose hereinbefore set forth.

In testimony that I claim the foregoing as my own I have hereto affixed my signature in presence of two witnesses.

JOHN E. KLINE.

Witnesses:
  THOS. B. WILSON,
  EDGAR B. WILSON.